C. W. ZECKSER.
GRIP.
APPLICATION FILED MAY 1, 1916.

1,263,508.

Patented Apr. 23, 1918.

WITNESSES

INVENTOR
Charles W. Zeckser

BY

ATTORNEY

UNITED STATES PATENT OFFICE.

CHARLES W. ZECKSER, OF BUFFALO, NEW YORK.

GRIP.

1,263,508.

Specification of Letters Patent.

Patented Apr. 23, 1918.

Application filed May 1, 1916. Serial No. 94,766.

*To all whom it may concern:*

Be it known that I, CHARLES W. ZECKSER, a citizen of the United States, residing at Buffalo, in the county of Erie and State of New York, have invented certain new and useful Improvements in Grips, of which the following is a specification.

This invention has relation to grips, and the nature and objects thereof will be readily apparent to those skilled in the art to which it appertains, in the light of the following explanation of the accompanying drawings, illustrating what I now believe to be the preferred embodiment, or mechanical expression, of my invention from among other forms and arrangements thereof within the spirit of the invention, and the scope of the appended claim.

However, an object of the invention is to provide an improved grip, by way of a rake attachment, and contemplates a handle device for use in connection with rake handles, etc., which in use, are subjected to excessive heat, said attachment acting primarily to protect the fore-hand of the attendant, and consequently prevent burning thereof or injury thereto.

Another object of the invention is to so connect the several parts of the grip that by loosening the hold thereon, certain of said parts may be separated and the said grip removed.

In addition to the foregoing my invention comprehends improvements in the details of construction and arrangement of parts, to be hereinafter described and particularly pointed out in the appended claim.

In the accompanying drawings in which similar and corresponding parts are designated by the same characters of reference, throughout the several views in which they appear;

This invention finds its greatest degree of employment by firemen, attendants upon boilers, coal stokers or the like who are required to rake the fire occasionally with a rake having a metallic handle, which becomes heated and difficult to handle without one's hands becoming burned. I propose therefore to provide a grip adapted to surround the handle, which grip is formed of heat insulating material whereby it may be grasped by the hand, and the rake operated thereby.

With reference to the drawings my invention comprises in its essentials semi-circular, cylindrical sections 1 and 2, hingedly connected at one of their longitudinal edges. Said longitudinal edges being formed with apertured ears 3, for the reception of a hinge pintle 4.

Figure 1:
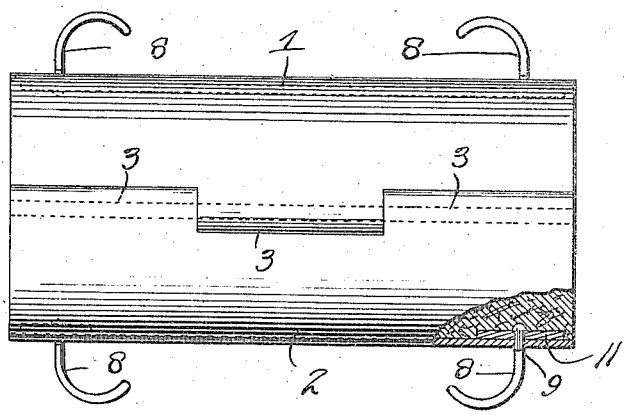
Figure 1, is a view in side elevation, partly in section, of a grip constructed after the manner of my invention.
Figure 2:
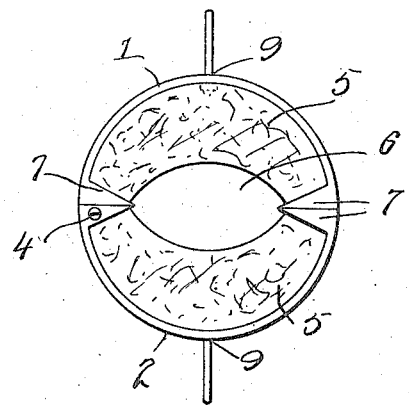
Fig. 2, is an end view thereof.
Figure 3:
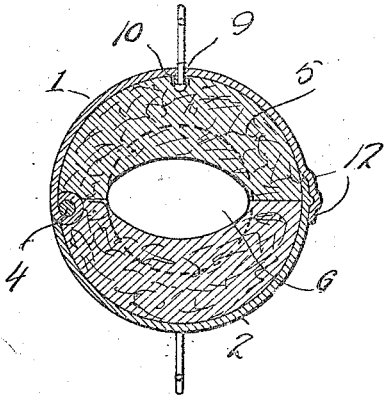
Fig. 3, is a transverse section.

Asbestos padding designated 5 is placed on the inner sides of the sections, and define when said sections are closed a substantially elliptical opening 6, in which the handle of the rake is received, and when in position, as shown in dotted lines in Fig. 3, the asbestos is compressed around the handle, and thus serves to frictionally retain the grip against displacement. Inwardly, and radially extending spurs are provided at the ends of the sections, and at the meeting edges thereof, indicated at 7 which form abutments when the sections are closed, and which also assist in retaining the asbestos therein.

For enabling the operator to retain his grasp upon the attachment I provide finger pieces 8, at opposite ends of the grip, and at opposite sides. One set of the finger pieces which are in the form of hooks having squared portions 9 extending through corresponding openings in the sections, are connected at their ends inside the sections by a bar 10, whereby the finger pieces are rigidly held, although the sections may become warped through excessive heat. The other set of finger pieces may if desired be provided at their inner ends with shorter bars 11, thus providing a modified form of construction.

The free longitudinal edges of the sections are formed with co-acting tongues 12, having a releasable locking engagement, and so that in use the separated sections are engaged around the tool handle and the tongues brought into locking engagement. In releasing the grip only slight force is necessary to disengage the locking tongues.

Thus it will be seen that I have provided a grip for use upon tool handles which become heated in use for enabling the user to operate the same without injury, the grip being composed partly of asbestos or the like, the inherent properties of said material precluding the transmission of heat. Various ways of constructing my invention will occur to those skilled in the arts, and I therefore reserve the right and privilege of changing the form of the details and otherwise altering the arrangement of the parts without departing from the spirit of the invention, or the scope of the appended claim.

Having thus described my invention what I claim to be new and desire to secure by Letters Patent is:—

A grip of the character described comprising hingedly connected semi-cylindrical grip sections, an asbestos lining for said sections, means to releasably lock the sections together, finger pieces substantially hooked shaped and having squared portions for engagement in corresponding openings in the sections, and a bar connecting the inner ends of the finger pieces.

In testimony whereof I affix my signature in presence of two witnesses.

CHARLES W. ZECKSER.

Witnesses:
FREDOLIN A. BISCHOFF,
WM. J. STEVENS.

Copies of this patent may be obtained for five cents each, by addressing the "Commissioner of Patents, Washington, D. C."